United States Patent [19]

Jehle et al.

[11] Patent Number: 4,881,077
[45] Date of Patent: Nov. 14, 1989

[54] RADAR ARRANGEMENT

[75] Inventors: Franz Jehle, Ulm; Martin König, Günzburg; Erwin Wölfle, Ehingen, all of Fed. Rep. of Germany

[73] Assignee: Licentia Patent-Verwaltungs-GmbH, Frankfurt, Fed. Rep. of Germany

[21] Appl. No.: 60,106

[22] Filed: Jun. 9, 1987

Related U.S. Application Data

[63] Continuation-in-part of Ser. No. 719,316, Apr. 3, 1985, abandoned.

[30] Foreign Application Priority Data

Apr. 14, 1984 [DE] Fed. Rep. of Germany ....... 3414158

[51] Int. Cl.$^4$ .................. G01S 13/94; G01S 13/95
[52] U.S. Cl. .................... 342/26; 342/159; 342/188; 342/365
[58] Field of Search ............. 342/26, 188, 361, 363, 342/365, 159

[56] References Cited

U.S. PATENT DOCUMENTS

| | | | |
|---|---|---|---|
| 2,851,681 | 9/1958 | Cohn | 342/188 |
| 2,942,260 | 6/1960 | Carter | 342/188 X |
| 3,001,193 | 9/1961 | Marie | 342/188 X |
| 3,268,891 | 8/1966 | Atlas | 342/188 X |
| 3,357,013 | 12/1967 | Hart | 342/188 |
| 3,540,045 | 11/1970 | Taylor | 342/188 X |
| 3,566,403 | 2/1971 | Hills | 342/188 X |
| 3,614,787 | 10/1971 | Hart | 342/188 X |
| 3,918,055 | 11/1975 | Shimizu et al. | 342/188 X |
| 3,947,848 | 3/1976 | Carnahan et al. | 342/16 |
| 3,978,483 | 8/1976 | Lewis et al. | 342/381 |
| 4,010,469 | 3/1977 | Marcum | 342/16 |
| 4,044,359 | 8/1977 | Applebaum et al. | 342/379 |
| 4,075,633 | 2/1978 | Lewis | 342/381 |
| 4,106,015 | 8/1978 | Beguin et al. | 342/89 |
| 4,283,795 | 8/1981 | Steinberger | 342/361 X |
| 4,295,140 | 10/1981 | Brockman | 342/188 X |
| 4,329,687 | 5/1982 | Kloevekorn et al. | 342/188 X |
| 4,739,327 | 4/1988 | König et al. | 342/26 |

Primary Examiner—Thomas H. Tarcza
Assistant Examiner—Bernarr Earl Gregory
Attorney, Agent, or Firm—McGlew & Tuttle

[57] ABSTRACT

A radar arrangement which is particularly useful for the terrain following radar of an aircraft avoids disturbances from rain echoes by utilizing an antenna arrangement with a transmitting/receving directional antenna which is circularly polarized. A supplementary receiving antenna of orthogonally-circularly polarized type is used in conjunction with the directional antenna. From a comparison of the signal level distinctions is made between a target and a rain echo. The rain echo can thus be suppressed to give a truer target signal.

8 Claims, 2 Drawing Sheets

RADAR ARRANGEMENT

CONTINUATION INFORMATION

This application is a continuation-in-part of application Ser. No. 719,316 filed Apr. 3, 1985, now abandoned.

According to the invention, a supplementary antenna A2 is provided which is sensitive to counter-rotating circularly polarized signals from the main directional antenna A1. The non-directional antenna is sensitive to counter- or oppositely-rotating circularly polarized signals and the supplementary antenna is non-directional. By splitting up the functions between the highly directional antenna and the non-directional supplementary antenna, an even better picture of the oppositely rotating circularly polarized signals is received by a comparator than would be in the case of the prior art which relies on a single antenna.

This system utilizes the principle based on the fact that circularly polarized signals which are echoed off of raindrops which are presumed to be spherical, are predominantly circularly polarized in an opposite sense or direction. Other, nonspherical targets (such as ground and other aircraft) generally return a signal which has a mixture of circularly polarized components in both directions. The invention utilizes a supplementary antenna which is particularly sensitive to the opposite sensed circularly polarized signals.

According to the invention, a system is provided which uses a far simpler and cheaper apparatus and method for distinguishing rain echoes, as compared to the prior art. The present invention provides for a supplementary antenna which is designated only as a receiving antenna. The directional pattern of the supplementary antenna is not sharply focused and need not be scanned. The non-directional supplementary antenna need only view a rather limited solid angle which will be further scanned by the directional antenna further, permitting the use of a relatively inexpensive, non-directional antenna as the supplementary antenna. For the suppression of rain echoes, only the level of the signals received via the supplementary antenna are of importance so that the respective reception channels can have a very simple form. The invention further provides a level comparator which is a simple and inexpensive circuit part which is readily available in the field. Rain suppression according to the present invention, does not influence the construction and operation of the transmitting/receiving antenna for the actual target or obstacle recognition function or other common radar functions.

Additionally, from the foregoing features, it is apparent that the present invention is especially suitable for supplementing and improving existing radar; in particular drain-fouling radar. In this way, existing radar arrangements can be retro-fit with the present invention to improve their echo suppression at little additional cost.

The various features of novelty which characterise the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

FIELD AND BACKGROUND OF THE INVENTION

The present invention relates in general to radar, and in particular to a new and useful radar arrangement which utilizes a supplementary receiving antenna in combination with circularly polarized radiation to suppress rain echoes.

Radar echoes of rain may, when being evaluated in radar systems, be wrongly interpreted as target signals and give rise to wrong measures. Especially in terrain following radar systems this may result in grave reaction errors.

For the automatic control of low-flying aircraft, terrain following radar systems are used which check the distance from the ground and monitor the space lying in the flight direction for obstacles. If a target appears in the flight direction, it is interpreted as an obstacle and automatically an evasion maneuver is initiated. But echoes from the flight direction occur also in rain, so that with the automatic control the aircraft would climb over all clouds. To prevent the flight path control being influenced by echoes deriving from rain, which simulate an obstacle, it is known practice to emit circularly polarized radiation and to receive only radiation components polarized codirectionally with the emitted radiation. This is based on the findings that upon reflection of the radiation from rain drops the direction of rotation of the polarization is largely reversed, so that rain echoes can be suppressed by polarization-selective receiving devices.

The polarization suppression, however, is not so complete that even in heavy rain wrong obstacle signaling and hence wrong flight maneuvers could be ruled out.

SUMMARY OF THE INVENTION

It is the object of the invention to further improve the suppression of rain echoes in a radar arrangement of the type mentioned above.

The solution of this problem according to the invention involves the inclusion of a supplementary receiving antenna for reception of orthogonal-circularly polarized radiation and by the inclusion of a level comparator to which the corresponding reception signal levels of the supplementary antenna and of the directional antenna are supplied. When a given value for the level ratio is exceeded, evaluation of the echo signals are suppressed.

According to the invention, the rain echoes, on being received via the supplementary antenna, are not suppressed by polarization-selective measures, but are given preference over other signals. Thus further information is at hand, from which a reliable decision whether or not a reception signal originates from a rainy area can be derived by level comparison. The radiation reflected from a true obstacle generally does not show a preferential polarization, so that the ratio of the signal level corresponds to the ratio of the antenna sensitivities.

For rain echoes, this level ratio is shifted substantially in favor of the reception signal of the supplementary antenna. According to the invention, therefore, the decision that rain echoes are present is made when a certain value, which depends on the arrangement in its specific details, for the level ratio of the signals from the supplementary antenna and from the directional antenna, is exceeded, and the evaluation of the echo signals, e.g. in a terrain following control unit, is suppressed.

An advantageous form of the invention provides for the inclusion of an additional receiving antenna which is polarized codirectionally with the directional antenna. The additional antenna and the supplementary antenna have approximately equal patterns whose sensitivity is approximately constant within the solid angle region to be monitored. For the additional antenna and for the supplementary antenna it is then possible advantageously to use cheap, space- and weight-saving horn antennas or open hollow waveguide radiators. Since the additional antenna and the directional antenna, though being polarized alike, have widely differing patterns, it is possible through a further level comparison of the reception signals of these two antennas to recognize reception signals through side lobe reception at the directional antenna and to avoid errors resulting therefrom.

According to a favorable development, it is provided, for the recognition of rain echoes, to supply to the level comparator the reception signals of the additional antenna instead of the reception signals of the directional antenna. The two antennas connected to the level comparator then have identical patterns.

A preferred embodiment provides for the use of an antenna arranged for left- and right-circular polarization instead of the form with separate supplementary antenna and additional antenna.

BRIEF DESCRIPTION OF THE INVENTION

In the following, the invention is illustrated in the example of a radar arrangement for a terrain following radar with reference to the drawings, in which:

FIG. 4b is a block diagram showing a comparator input arangement equivalent to that of FIG. 4a.

DESCRIPTION OF THE PREFERRED EMBODIMENTS

Figure 1:
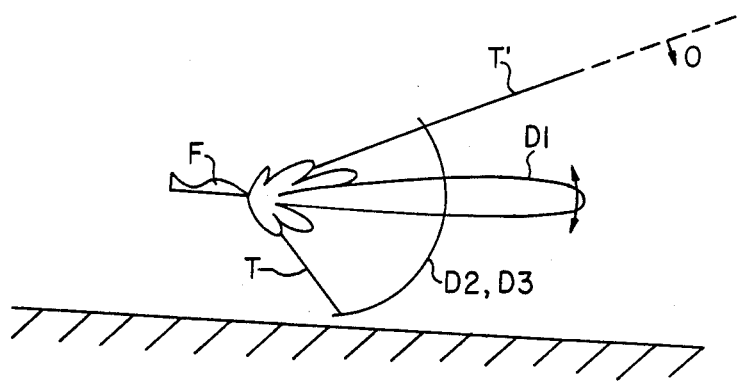
FIG. 1 is a schematic diagram showing the solid angle region to be monitored with the antenna pattern.

The solid angle region to be monitored, which in FIG. 1 is limited by the straight lines, T, T', is laid out in accordance with the task of the terrain following radar for checking the relatively low flight of the aircraft F over the ground and for the recognition of obstacles in the flight direction. The sharply focused directional pattern D1 of the transmitting/receiving antenna can pivot up and down and thus scan the entire solid angle region between line T and line T'. The pattern D2 of the supplementary antenna and the identically formed pattern D3 of the additional antenna are fixed and have an approximately constant sensitivity over the entire solid angle region (non-directional).

Figure 2:
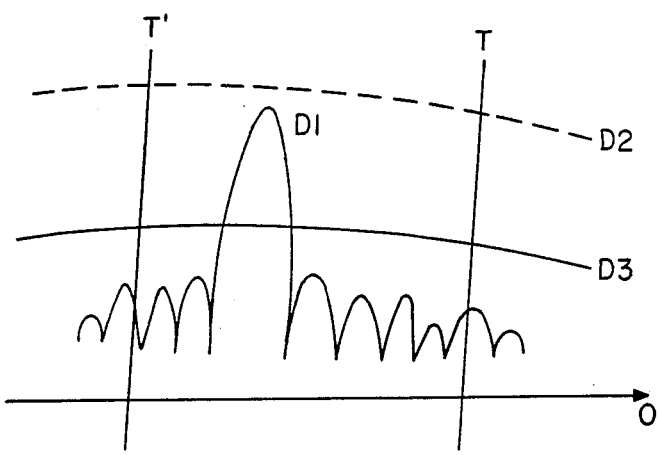
FIG. 2 is a graph showing the antenna pattern in cartesian representation.

FIG. 2 shows the curve of the antenna patterns relative to each other in cartesian plotting over the elevational angle. Due to their different shape, the two right-circular polarization patterns D1 of the directional antenna and D3 of the additional antenna permit, by comparison of the levels of the signals received via these patterns, a distinction of signals which are received via the main lobe of the directional antenna from signals which are received via the side lobes.

For echoes with static-vertical polarization, as for instance ground echoes, the supplementary antenna and the additional antenna show the same sensitivity. For the left-circular polarization rain echoes, on the contrary, the sensitivity of the additional antenna (and of the directional antenna) is considerably lower, while the sensitivity of the supplementary, left-circular polarization antenna increases. This relative displacement of the sensitivity is indicated for the supplementary antenna by the dashed line in FIG. 2.

Figure 3:
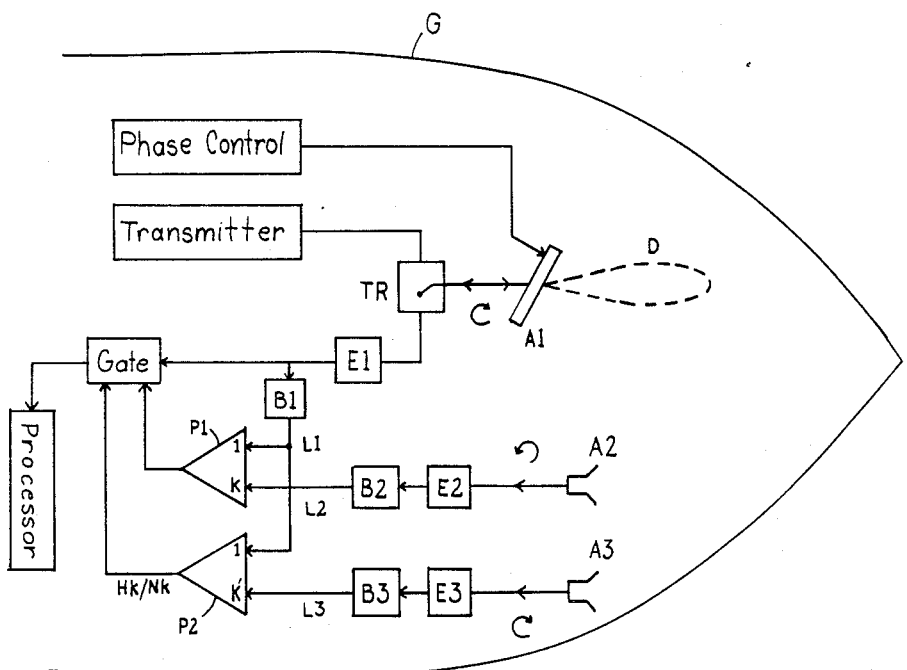
FIG. 3 is a block diagram showing an embodiment of the invention.

The antenna arrangement of FIG. 3 is protected by radome G and contains a transmitting/receiving antenna A1 with a scanning, sharply focused directional pattern, a horn radiator A2 as supplementary receiving antenna, and a second horn radiator A3 as additional receiving antenna. The transmission signal S is supplied from a transmitter 10 via a transmitting/receiving switch TR to the antenna A1, which radiates it as a right-circular polarization wave. Of the echo radiation reflected to the antenna arrangement, only the right-circular polarization components are received by the antennas A1 and A3, and in antenna A2 only the left-circular polarization components are received. These are all conducted to the connected reception channels E. The output signals of the reception channels are supplied to a level comparator P, which by comparison of the signal levels distinguishes between main lobe (Hk) and side lobe (Nk) reception of the directional antenna and between target echo Z and rain echo R.

Because of the small space requirement and low weight and because of the easy possibility of suppressing in the described manner besides rain echoes also side echoes, the invention is suitable especially for use in a terrain following radar system of an aircraft.

The antenna system shown in FIG. 3 is protected by a radome G and contains a transmit/receive directional antenna A1 with sharply focused directional diagram D1 that can be pivoted and the two antennas A2 and A3, whose diagrams cannot be pivoted and have an approximately constant sensitivity within the angular range between T and T' indicated in FIGS. 1 and 2. The transmission signal S produced in the radar transmitter is fed to the antenna A1 through a transmit/receive switch. Let the antenna A1 in the example illustrated be designed as a phase-array antenna whose diagram orientation is determined in a known manner by the adjustment of the phase shifters associated with the individual radiators. The diagram is pivoted by adjusting the phase shifter through a phase control device. Instead of the phased-array antenna, an antenna pivoted mechanically by a servomotor can also be provided. The antennas A2 and A3 are designed only as receiving antennas. Since these antennas should have an antenna diagram that is not focused, or only slightly focused (not drawn in FIG. 3), antennas of simple construction such as horn antennas can be used.

Of the echoes reflected to the antenna system, only the right-handed circularly polarized signal fractions are received by the antennas A1 and A3, and only the left-handed circularly polarized signal fractions are received by the antenna A2, and fed to the receiving channels E1, E2, and E3 connected to the antennas. For the output signals of the receiving channels, the signal levels L1, L2, and L3 are obtained in level detectors B1, B2, B3. The signal level L1 of the signals received through the transmit/-receive antenna A1 is compared in a first level comparator P1 with the level L2 of the signals received through the receiving antenna A2. The level L2 is preferably valued higher by a constant prescribed factor k (with k>1) than the level L1, because of the large difference between the high antenna gain of the sharply focused antenna A1 and the low antenna gain of the horn radiator antenna A2 is partly compensated for. Becaue of the high antenna gain of the antenna A1, the signal level L1 for ground echoes or echoes from true targets is substantially higher than the ground level L2 and also higher than k(L2), so that because L1<k(L)2 or L1/L2<K, the comparator P1 emits an output signal Z corresponding to the decision on the presence of a target echo or ground echo. Rain echoes, which are circularly polarized in essentially the opposite direction from the broadcast signal, are preferentially received by the antenna A2 and only to a smaller extent by the antenna A1, so that in this case the level L1 is smaller than k(L2) and the comparator P1 consequently emits a signal R as an indication of the presence of a rain echo signal.

A second level comparator P2 compares the level L1 of the right-handed circularly polarized signals received by the transmit/receive antenna with the level L3 of the signals polarized in the same direction received through the receiving antenna A3. Here also, one of the two levels can be evaluated with a constant k' to assure that the sensitivity of the antennas A3, with consideration of this evaluation factor, is distinctly higher than the side lobe sensitivity of the antenna A1 and distinctly lower than the main lobe sensitivity of the antenna A1 (in this regard, refer to D1, D3 in FIG. 2). The magnitude of the factor k', therefore, is found in the particular case from the prevailing antenna diagrams of the antennas A1 and A3 in each case (and k' can also be equal to 1). For signals received through the main lobe of the antenna A1, because of the high antenna gain, the level L1 is substantially higher than the evaluated level K'(L3) of the signals received through the antenna A3, so that the level comparator P2 emits an output signal HK. For echo signals received through the side lobes of the antenna A1, the level L1 is distinctly below the level K'(L3), and the comparator P2 emits an output signal NK.

The output signals of the two level comparators P1 and P2 control a gate in the signal path of the output signal of the first receiving channel E1 in such a way that the gate passes the signals of this receiving channel through to the input of an ordinary echo processor for further processing only when an output signal Z of the first level comparator P1 and an output signal HK of the second level comparator P2 are present at the same time, i.e., in the case of target echoes or ground echoes received through the main lobe of the first level comparator P1, and/or an output signal NK (side lobe reception of the antenna A1) from the second level comparator P2, the signal path is interrupted by the gate and the further evaluation of false echo signals is thereby suppressed.

Figure 4A:
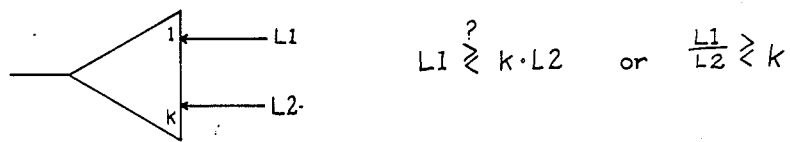
FIG. 4a is a block diagram showing the input and output of comparator.
Figure 4B:
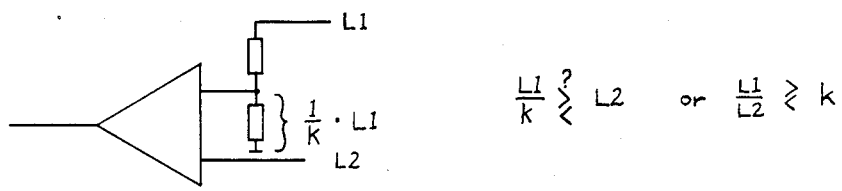

The level comparison of the various signals and the suppression of rain echoes or side lobe echoes by the gate is described very explicitly for one of ordinary skill in the art in regard to the description of FIG. 3. FIG. 4 shows in greater detail the accomplishment of the evaluation with a constant factor in the comparators P1, P2, the action of a resistance-voltage divider can be seen. As shown in FIG. 4A, a comparator such as comparator P1 or P2 is shown with, for instance, signal levels L1 and L2 fed into the comparator P1. As discussed above, the level L2 is preferably valued higher by a constant prescribed factor K so that the comparator is considering L1><K(L2) or L1/L2><K. This is equivalent to FIG. 4B, L1/K><L2 or L1/L2><K. It can be seen from this that when L1 is >K(L2) or L1/L2>K, the comparator P1 will emit an output signal Z corresponding to the decision on the presence of a target echo or ground echo. As discussed above, in the case of rain echoes which are circularly polarized and are received preferentially by the antenna A2 so that the level L1 is <K(L2) so that the comparator P1 consequently emits a signal R as L1/L2<K.

While a specific embodiment of the invention has been shown and described in detail to illustrate the application of the principles of the invention, it will be understood that the invention may be embodied otherwise without departing from such principles.

What is claimed is:

1. A radar arrangement comprising, transmitter means for supplying a circularly polarized signal being circularly polarized in a first direction, a directional antenna connected to said transmitter means for receiving said signal and transmitting a circularly polarized directional pattern which is circularly polarized in the first direction, a supplementary non-directional antenna which is sensitive to circularly polarized signals in an opposite direction to said circularly polarized signals being polarized in a first direction, said directional antenna being more sensitive to circularly polarized signals in the first direction than to circularly polarized signals in the opposite direction, a level comparator means connected to said directional antenna and said supplementary antenna for comparing the level of the signals of the directional antenna and the level of the signals from the supplementary non-directional antenna to each other for determining if the ratio of the level of the signals of the directional antenna to level of the signals of the supplementary non-directional antenna differs from a predetermined ratio of the directional antenna sensitivity to the supplementary non-directional sensitivity providing n indication of echo signals which are due to rain.

2. A radar arrangement according to claim 1, including an additional non-directional antenna connected to said level comparator, said additional antenna being more sensitive to said circularly polarized signals in said first direction than said circularly polarized signal in said opposite direction with said circularly polarized signal of said opposite direction being supplied by said supplementary antenna to said level comparator.

3. A radar arrangement according to claim 2, wherein said supplementary and said additional antennae comprise horn radiators.

4. A radar arrangement according to claim 2, wherein said supplementary and said additional antennae comprise open hollow waveguide radiators.

5. A radar arrangement according to claim 2, wherein said transmitter means includes means for causing said directional pattern of said directional antenna to scan vertically from an upper line to a lower line with an acute angle formed between said upper and lower lines, whereby said directional antenna is useful in following terrain.

6. A method for providing an indication of echo signals which are due to rain comprising the steps of: supplying a circularly polarized signal by a directional antenna, said circularly polarized signal being circularly polarized in a first direction; receiving signals, by a supplementary non-directional antenna which is sensitive to circularly polarized signals in an opposite direction to said circularly polarized signals being circularly polarized in a first direction; receiving signals by the directional antenna which is more sensitive to circularly polarized signals in the first direction than to circularly polarized signals in the opposite direction; comparing the circularly polarized signals received by the directional antenna and the signals received by the supplementary non-directional antenna and determining if the ratio between the level of the signals received by the directional antenna to the level of the signals received by the supplementary non-directional antenna differs from a predetermined ratio of the directional antenna sensitivity to the supplementary non-directional antenna sensitivity providing an indication of echo signals which are due to rain.

7. A method according to claim 6, further comprising: causing said directional pattern of said directional antenna to scan vertically from an upper line to a lower line with an acute angle formed between said upper and lower lines, whereby the directional antenna is useful in following terrain.

8. An automatic rain echo suppression radar system for use with terrain following radar systems comprising: transmitter means supplying a circularly polarized signal being circularly polarized in a first direction; a directional antenna connected to said transmitter means, said antenna receiving said signal and transmitting a particularly polarized directional pattern which is circularly polarized in the first direction, the directional antenna being more sensitive to circularly polarized signals in the first direction than to circularly polarized signals in a direction orthogonal to the first direction for receiving echo signals reflected to the directional antenna circularly polarized in the first direction; first level means for receiving echo signals reflected to the directional antenna and for outputting the level of the signal reflected to the directional antenna; a supplementary non-directional antenna which is sensitive to circularly polarized signals in a direction orthogonal to the first direction for receiving echoes signals circularly polarized orthongonally to the first direction; the second level means for receiving the signals reflected to the non-directional antenna and outputing the level of the signal reflected to nondirectional antenna; means for scaling the level signal of said non-directional antenna signal by a factor equal to the ratio of said sensitivities of said directional antenna to said nondirectional antenna; comparator means for comparing the nondirectional signals to the directional signals as an indication of a rain echo signal; and, gate means receiving said signal from said comparator for allowing the passage of the signal from said directional antenna when no rain echo signal is present and blocking the passage the signal from the directional antenna when there is an indication of a rain echo signal.

* * * * *